United States Patent [19]

Strange

[11] 3,943,483
[45] Mar. 9, 1976

[54] DEPTH CONTROLLERS FOR SEISMIC STREAMER CABLES WITH DIMENSION VARIABLE LIFT-PRODUCING MEANS

[75] Inventor: Booth B. Strange, Houston, Tex.

[73] Assignee: Western Geophysical Company of America, Houston, Tex.

[22] Filed: May 8, 1974

[21] Appl. No.: 468,127

[52] U.S. Cl............ 340/7 PC; 114/235 B; 43/43.13
[51] Int. Cl.² ...................... G01V 1/00; B60P 3/00
[58] Field of Search............... 340/7 PC; 114/235 B; 43/43.13

[56] References Cited
UNITED STATES PATENTS

| | | | |
|---|---|---|---|
| 3,380,424 | 4/1968 | Bowker et al.................. | 114/235 B |
| 3,680,520 | 8/1972 | Smith.............................. | 340/7 PC |
| 3,839,985 | 10/1974 | Modert........................... | 114/235 B |

Primary Examiner—Maynard R. Wilbur
Assistant Examiner—S. C. Buczinski
Attorney, Agent, or Firm—Michael P. Breston

[57] ABSTRACT

A depth controller having a streamlined body which comprises retractable and extendable lift producing means, such as a main pair of vanes that can produce a variable negative lift and an auxiliary pair of vanes that can produce a variable positive lift. Each pair is movable by translation or rotation in a single plane, inclined relative to the horizontal. Depth control means are operatively coupled to retract the main pair of vanes inward as the controller moves from the water surface down to a reference depth and to extend the auxiliary pair of vanes outward as the controller falls below the reference depth. Each controller can be used to effectively maintain a seismic streamer cable section at or near the desired reference depth.

12 Claims, 22 Drawing Figures

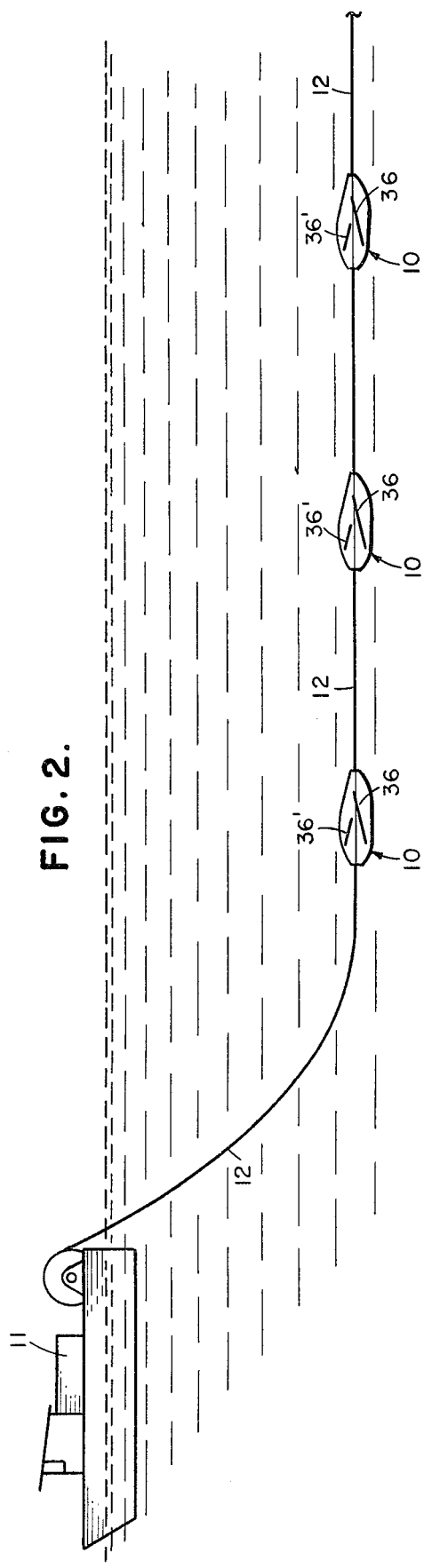
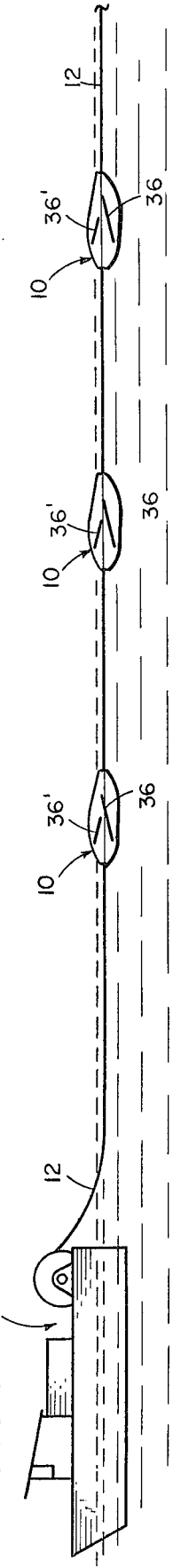
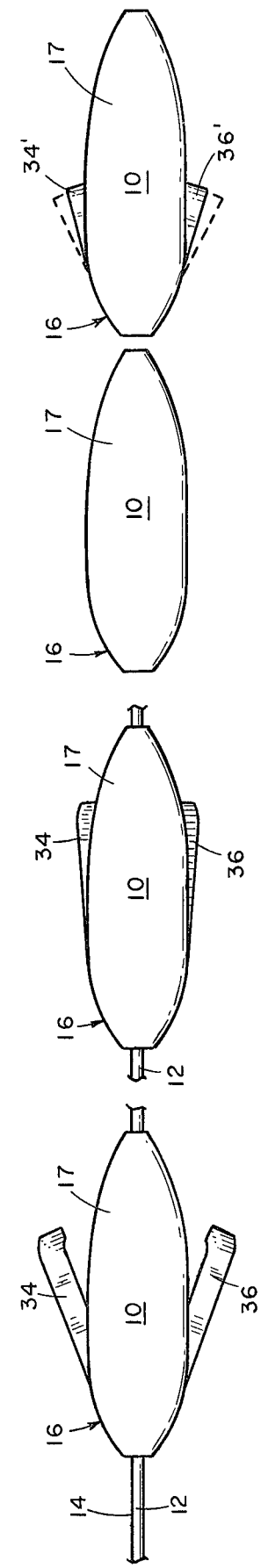
FIG. 2.
FIG. 1.
FIG. 1A.
FIG. 2A.
FIG. 2B.
FIG. 2C.

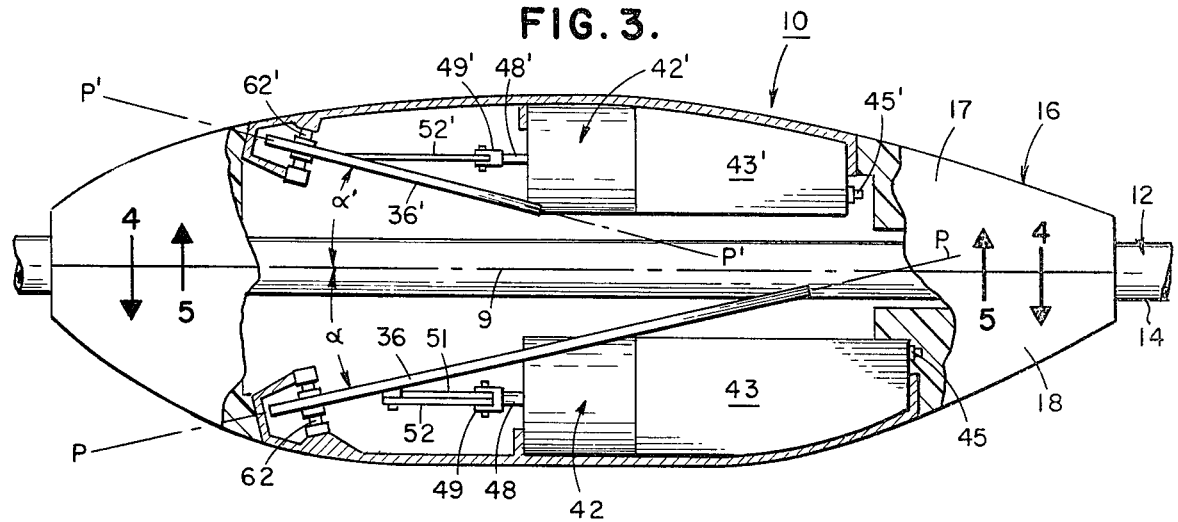
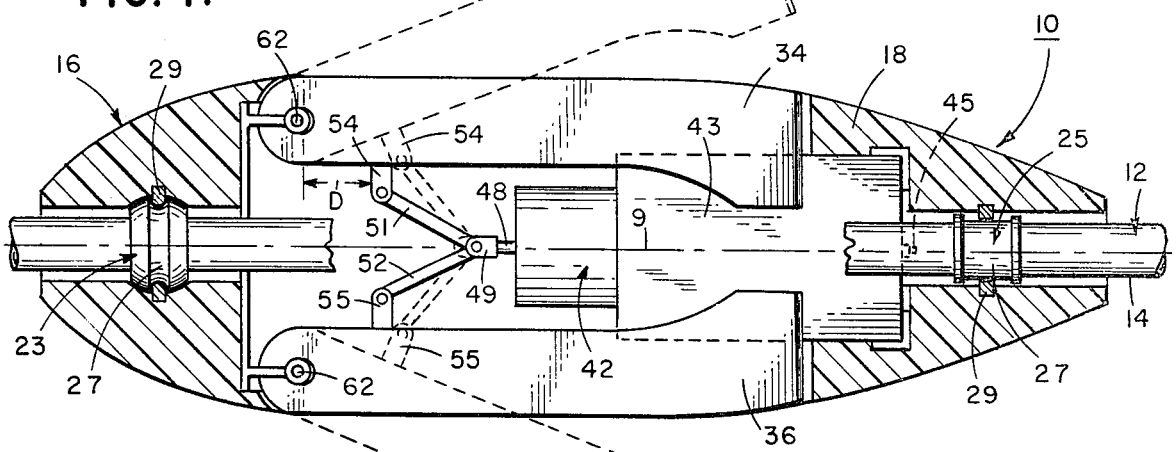
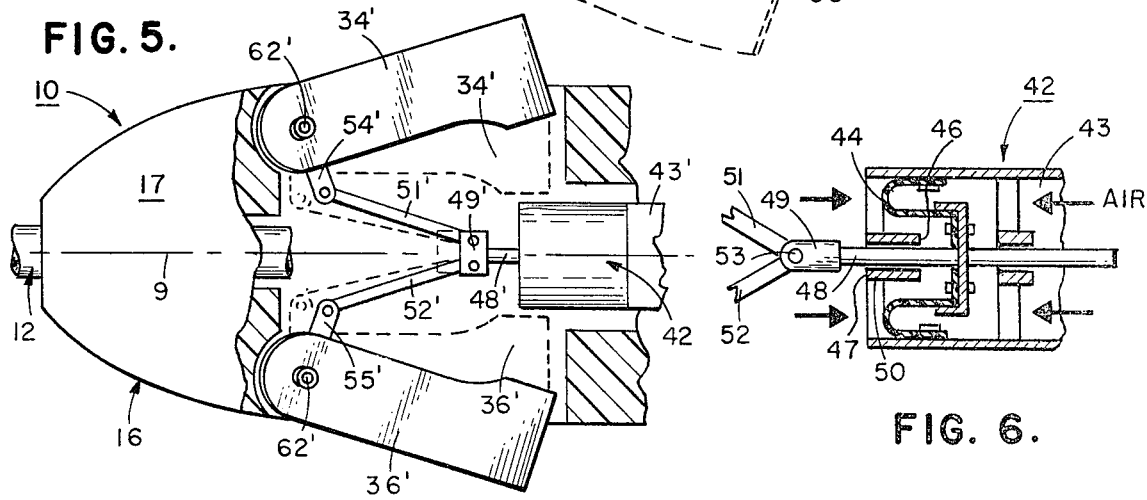
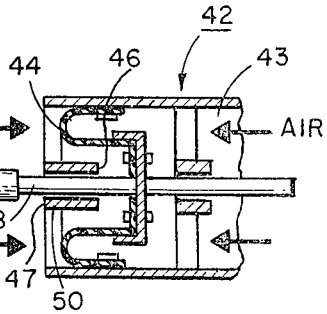

U.S. Patent  March 9, 1976  Sheet 4 of 4  3,943,483
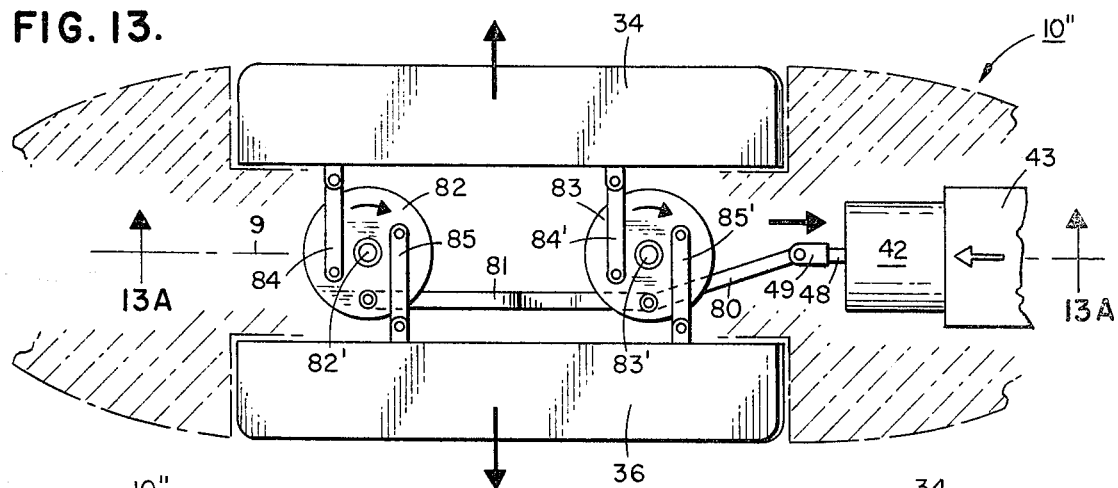
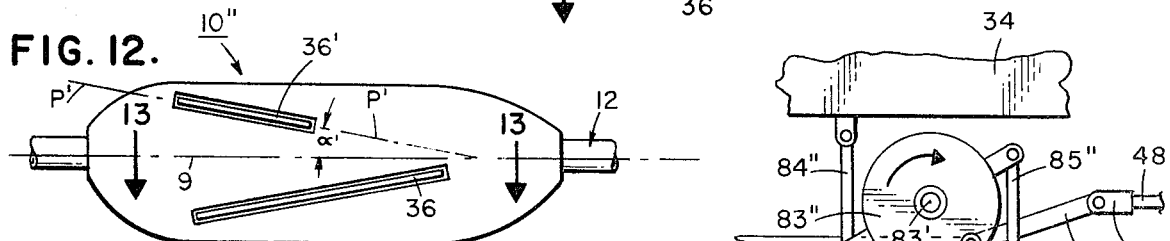
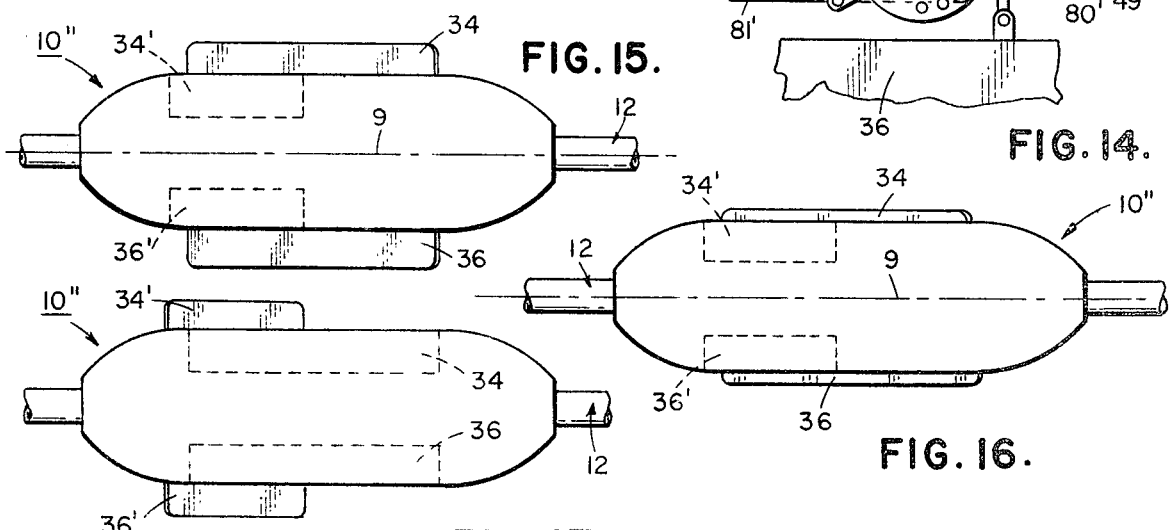
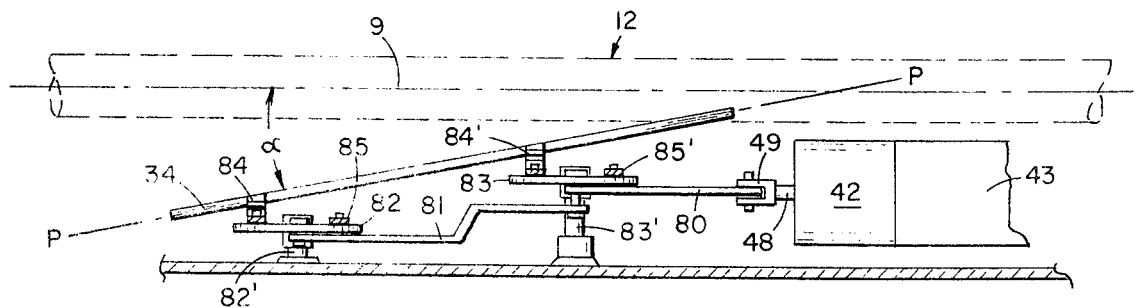

DEPTH CONTROLLERS FOR SEISMIC STREAMER CABLES WITH DIMENSION VARIABLE LIFT-PRODUCING MEANS

BACKGROUND OF THE INVENTION

1. Field of the Invention

This invention relates to depth controllers such as are used in marine seismic prospecting for controlling the depth of seismic marine streamer cables.

2. Description of the Prior Art

In marine seismic surveying by the use of seismic streamer cables, it is the present practice to mount a plurality of spaced-apart depth controllers throughout the length of the cable to maintain it within a predetermined depth range. A commonly-used depth controller is described in U.S. Pat. No. 3,375,800. Other type controllers are described, for example, in U.S. Pat. Nos. 3,531,761 and 2,531,762.

The known depth controllers, especially those that are now in wide use, are characterized by a pair of vanes rotatable about a fixed horizontal axis perpendicular to the streamer cable. The vanes assume a particular climbing or diving angle, dependent on the instantaneous depth within the water of the seismic cable section to which the controller is attached. The vanes' rotation about the horizontal axis is controlled, by a pressure-responsive device. When the cable's controller falls below a reference depth, its vanes rotate into a position to produce positive lift and the controller will lift the cable; on the other hand, when the cable climbs above the reference depth, the vanes rotate to produce negative lift and the controller will lower the cable. In this manner, the cable is automatically maintained within a prescribed depth range.

In any prior art controller with vanes rotating about a horizontal axis perpendicular to the controller's body, the chief drawback is that at any depth, especially at the cable's operating depth, the vanes remain completely outside of the controller's body. Fully exposed vanes generate turbulence and contribute appreciably to the undesired noise detected by the hydrophones within the streamer cable. Other known drawbacks are: the fully-exposed vanes have a tendency to snag debris, seaweed, etc. Such foreign matter may foul the vanes and interfere with their functioning, especially when the foreign matter becomes wedged between the vanes and the body. Often, the vanes become snagged on a reef or wreck, thereby completely and abruptly stopping the cable while under tow and causing the cable to become severed. Under such circumstances, a part or all of a very expensive streamer cable may be irretrievably lost. An additional, though relatively minor disadvantage of such prior art controllers is that their storage aboard ship requires excessive space, since their vanes cannot be retracted into the bodies of the controllers.

SUMMARY OF THE INVENTION

The present invention contemplates broadly new and improved depth controllers, such as can be used for seismic streamer cables having retractable and extendable lift producing means. Depth-responsive means, typically responsive to water pressure, move the depth control elements, such as vanes, inward and outward of the controllers' bodies.

In a presently preferred embodiment, each depth controller contains two pairs of symmetrically disposed vanes. A main pair of vanes that have a fixed negative angle of attack and an auxiliary pair of vanes that have a fixed positive angle of attack. The negative lift is maximum at the water's surface, thereby tending to rapidly lower the controller as it moves forward in the body of water. At a reference depth, the negative lift decreases to nearly zero or is balanced out.

The auxiliary pair of vanes are contracted. They only extend when the controller falls below the reference depth. Then, they produce a positive lift and gradually retract as the controller is being restored to the reference depth.

The inward and outward movement of the vanes can be achieved by allowing the vanes to extend or retract by translation, i.e., all parts of the vanes move inwardly or outwardly together in parallel, or by rotation, i.e., the vanes are pivoted at one of their ends about axes substantially perpendicular to the planes of the vanes.

BRIEF DESCRIPTION OF THE DRAWINGS

FIG. 1 shows a seismic streamer cable towed by a seismic vessel and a plurality of longitudinally-displaced depth controllers of one embodiment of this invention mounted on the cable. The cable is shown as being near the surface water. The main pair of vanes in each controller are then fully extended;

FIG. 2 is a view similar to FIG. 1 but with the cable and controllers at the desired predetermined water depth;

FIGS. 1A, 2A, 2B, and 2C are top views of one embodiment of the controller having rotatable vanes and showing various angular positions of the vanes;

FIG. 3 is a vertical partly sectional view of the controller's body showing the vanes' independent depth-control mechanisms;

FIGS. 4 and 5 are partly sectional views taken on lines 4—4 and 5—5 in FIG. 3;

FIG. 6 is a schematic representation of a single depth-control mechanism;

FIG. 12 is a side view in elevation of another embodiment of the controller having vanes mounted for translational movement;

FIG. 13 is a partly sectional view on line 13—13 in FIG. 12, illustrating a drive mechanism for the vanes;

FIG. 13A is a view on line 13A—13A in FIG. 13 showing the depth control mechanism for extending and retracting the main vanes in the embodiment of FIG. 12;

FIG. 14 shows a modification of the drive mechanism of FIG. 13; and

FIGS. 15–17 show the depth controller of FIG. 12 with variable vane positions.

In the drawings, similar reference characters denote the same or similar parts throughout the several views. Although the invention is applicable to controlling the depth of any towed object, it will be illustrated herein only with reference to seismic streamer cables.

Referring to FIGS. 1, 2, 1A and 2A–C, a plurality of depth controllers, generally designated as 10, are rotatably mounted on a seismic streamer cable 12 which typically houses arrays of detectors (hydrophones) for receiving reflected seismic signals. Cable 12 is towed under tension by a seismic boat 11. A seismic streamer cable can be very long, say on the order of two miles.

Figure 7:
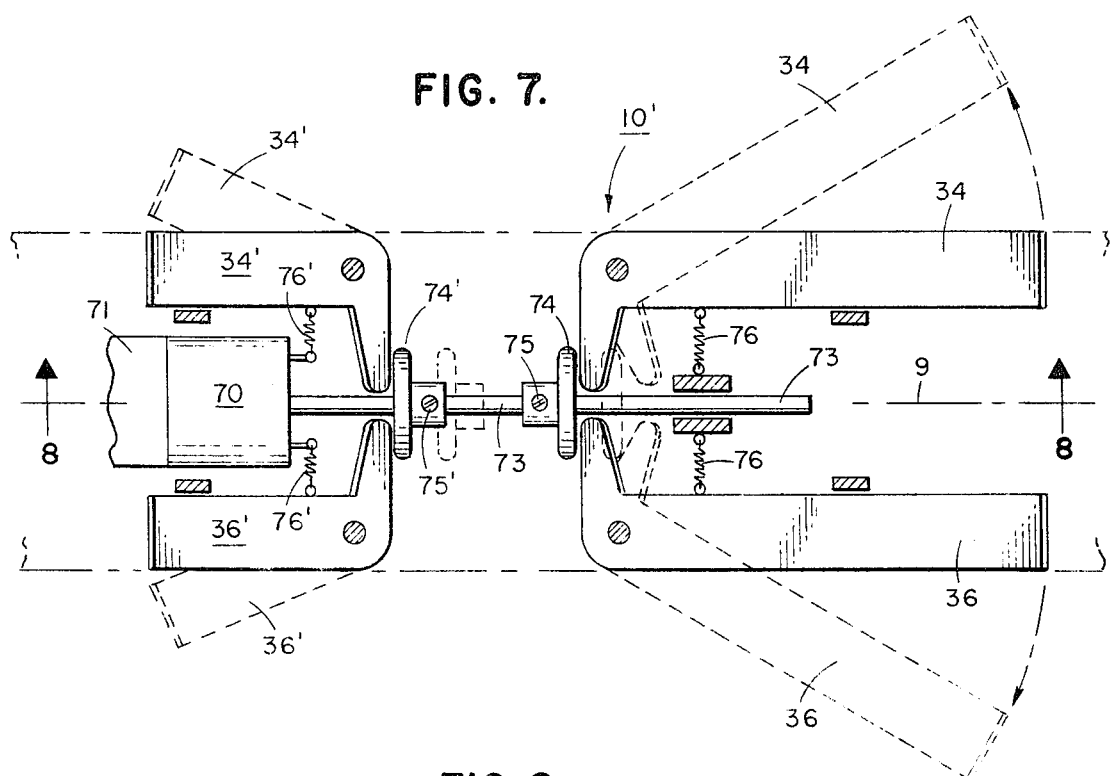
FIG. 7–10 schematically illustrate a dual depth-control mechanism.
Figure 8:
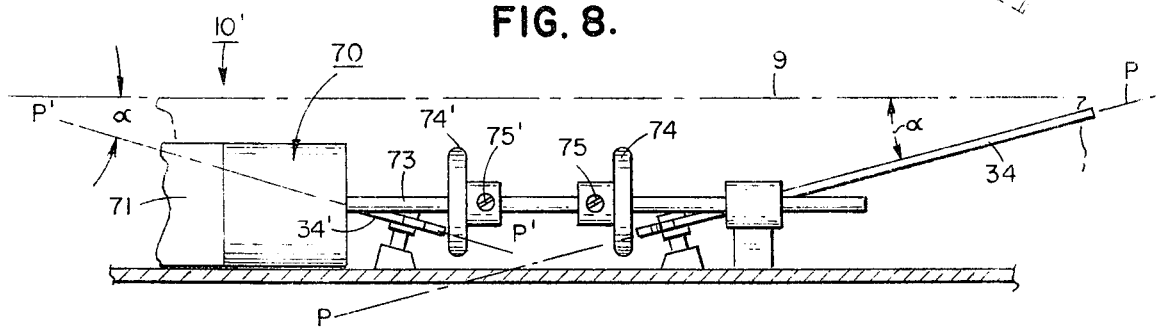

Cable 12 is conventionally made of an outer flexible tubular jacket 14. Inside the jacket are arrays of hydrphones, tension cables, pressure gauges, and other instruments (not shown). The cable is filled with a suitable liquid.

Each depth controller 10 (shown in FIGS. 1 and 2) has a streamlined body 16 comprising two half housings 17, 18. To allow cable 12 to rotate within body 16, there are provided two coupling means 23, 25 fixedly secured to and longitudinally-spaced apart on the outer jacket 14. Each coupling means may be made conveniently of two semi-cylindrical portions rigidly fastened to each other and to the outer surface of jacket 14. The outer cylindrical wall of each coupling is provided with a circumferential groove 27 which can have a substantially U-shaped or rectangular cross-section, each being adapted to loosely receive and rotatably support an annular yoke segment 29 made from two half-segments. Thus, free rotation between cable 10 and body 16 can take place about the cable's longitudinal axis 15, while linear movement therebetween is prevented by the engagement of yokes 29 within grooves 27.

Mounted for translational or rotational movement into or out of body 16 are depth control elements such as a main pair of vanes 34, 36 and an auxiliary pair of vanes 34', 36'.

Each pair of vanes serves as lift producing means which extend or retract in unison in response to a depth control signal that can be remotely applied from vessel 11, or internally produced by a force-generator. It can, for example, generate a force in response to a pressure variation from a predetermined pressure at a desired reference depth. The force-generator typically includes a pressure-to-force transducer 42 adapted to change a pressure variation into a linear translation, or into an angular rotation. The transducer has an air chamber 43 (FIG. 6) covered by a diaphragm 44, the external surface of which is exposed to ambient sea water pressure. Prior to use, chamber 43 is filled with air pressure through an air valve 45.

The maximum outward extended positions of vanes 34, 36 are determined by an annular shoulder 46 and the maximum contracted positions by an annular shoulder 47. The outer end of a longitudinal shaft 48 is provided with a U-shaped bracket 49. Shaft 48 is slidably mounted in a sleeve 50. Two linkage arms 51 and 52 are pivotably secured on a pin 53 in bracket 49 at one of their ends and to ears 54 and 55 at their other ends. The ears are also attached to vanes 34, 36, respectively. Each vane is mounted for rotation on an inclined shaft 62 which is perpendicular to the plane of the vane. Each of ears 54 and 55 is at a distance D from shaft 62 extending toward the outer free ends of the vanes.

The mounting of each pair of vanes is symmetrical relative to a vertical plane passing through the longitudinal center axis 9 of the controller. Whenever possible, therefore, symmetrical parts will be designated with a prime ('), and the description of symmetrical parts will not be repeated.

The inner voids in the controller's body are filled with a light-weight plastic foam material to make it positively buoyant. The body can be balanced with the aid of lead shot.

The pressure transducer 42' for driving the pair of auxiliary vanes 34', 36', is in all respects similar to the pressure transducer 42 above described. Each of ears 54', 55' is mounted on vanes 34', 36'.

In operation of the embodiment of the controller thus far described, before each controller is coupled to a section of the seismic cable, the air pressure in chambers 43, 43' is adjusted for the desired predetermined operating depth. When the controller is out of water, the outward force produced by the air pressure in chamber 43 is greater than the inward force exerted by atmospheric pressure, causing vanes 34, 36 to rotate maximally outwardly (FIG. 1A). Vanes 34, 36 move throughout their entire range in a single plane P—P which is inclined by an acute angle $\alpha$ relative to the horizontal. The vanes always move in a descending attitude, i.e., they are always inclined forwardly and downwardly (negative angle of attack) in respect to the controller's longitudinal axis 9'. The constant negative angle of attack of vanes 34, 36 preferably should not exceed 15°. As soon as each depth controller is lowered into the water, a hydrodynamic force becomes developed on each of the vanes as a result of the forward velocity of the seismic streamer cable. The instantaneous pressure exerted on each of the vanes and the center of its application will vary with the effective area of the vane exposed to the water outside of the controller's body and hence with the angular rotation of the vane. The vertical component of this force provides a negative lift to the seismic cable's section and its controller. This negative lift causes the depth controller to dive until it reaches the desired predetermined depth at which the air pressure in chamber 43 is balanced out by the ambient water pressure. When that happens, diaphragm 44 assumes its neutral or rest position, and vanes 34, 36 become fully retracted (FIG. 2B). The body itself of the controller is dynamically neutral, i.e., it has no dynamic lift component under tow.

When the controller is out of water, the outward force produced by the air pressure in chamber 43' of the auxiliary vanes 34' and 36' is greater than the inward force exerted by the atmospheric pressure, causing these vanes to remain fully retracted, as shown by the dotted lines in FIG. 5. Vanes 34', 36' move throughout their entire range in a single plane P'-P' which is inclined by an acute angle $\alpha'$ relative to the horizontal. The vanes always move in an ascending attitude, that is, they are always inclined forwardly and upwardly (positive angle of attack) in respect to the longitudinal axis 9. The constant positive angle of attack of vanes 34', 36' preferably should not exceed 15°. When the depth controller falls below the reference depth, by a predetermined amount, a hydrodynamic force becomes developed on each of the vanes as a result of the forward velocity of the cable. The instantaneous pressure exerted on each of the vanes will vary with the effective area of the vane exposed to the water outside of the controller's body, and hence with the angular rotation of the vane.

The vertical component of this force provides a positive lift to the seismic cable's section and its controller. This positive lift causes the depth controller to climb until it reaches the desired predetermined depth at which the air pressure in chamber 43' is again balanced out by the ambient water pressure. When that happens, diaphragm 44 assumes its neutral or rest position, an vanes 34', 36' return to their fully retracted position.

Should the cable again fall below the desired predetermined depth, auxiliary vanes 34', 36' will again fully extend outside of the body (FIG. 5), the positive lift exerted on the cable by the controller will then restore the cable to the desired predetermined depth. Should cable 10 rise above the predetermined depth, vanes 34, 36 will move outwardly (FIG. 2A) to thereby exert a negative lift sufficient to restore the cable back to its predetermined depth.

Instead of providing an individual depth control mechanism for each pair of vanes, it is possible to drive both pairs of vanes with a single transducer 70 (FIG. 10) having an air pressure chamber 71, a diaphragm 72, and a shaft 73 slidably movable in a cylinder 74. Each of vanes 34, 36, 34' and 36' is L-shaped. The leg of each main vane abuts against a head 74. The leg of each auxiliary vane abuts against a head 74'. Heads 74 and 74' are fixedly secured by set screws 75, 75', respectively, to shaft 73. Each of the vanes is biased to a contracted position by a coil spring 76. Normally, both pairs of vanes are fully retracted inside the body 16 of the controller.

The main and auxiliary vanes can be on the same side (FIG. 11) of the longitudinal axis 9 of the controller 10'. In operation, when the air pressure is greater than the water pressure, shaft 73 moves to the right, as viewed in FIG. 7, thereby causing vanes 34, 36 to extend and vanes 34', 36' to remain contracted. When the water pressure is greater than the air pressure in chamber 71, shaft 73 moves to the left, thereby causing vanes 34, 36 to retract and vanes 34', 36' to extend.

Main vanes 34, 36 move throughout their entire range in a single plane P—P which is inclined by an acute angle α relative to the horizontal. The vanes always move in a descending attitude, i.e., they are always inclined forwardly and downwardly (negative angle of attack) in respect to the controller's longitudinal axis 9. Auxiliary vanes 34', 36' move throughout their entire range in a single plane P'—P' which is inclined by an acute angle α' relative to the horizontal. The vanes always move in an ascending attitude, i.e., they are always inclined forwardly and upwardly (positive angle of attack) in respect to the longitudinal axis 9 of the controller.

Figures 10, 11:
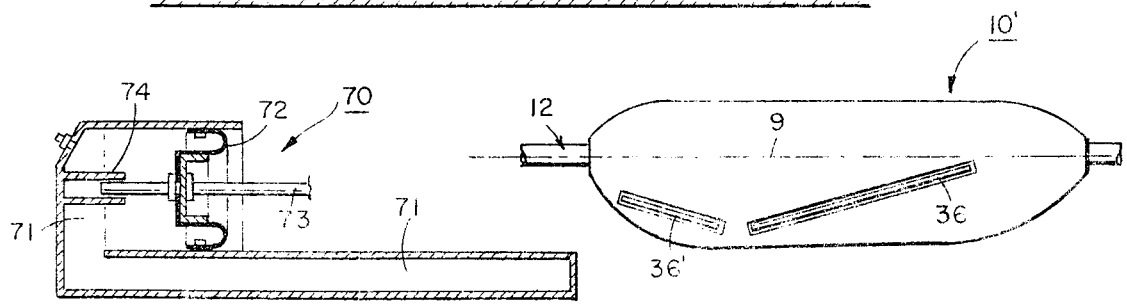
FIG. 11 is a front view of another embodiment of the depth controller using the depth control mechanism of FIGS. 7–10.

The operation of the controller 10' shown in FIG. 11 is otherwise identical to the operation of the depth controller 10 previously described.

Figure 9:
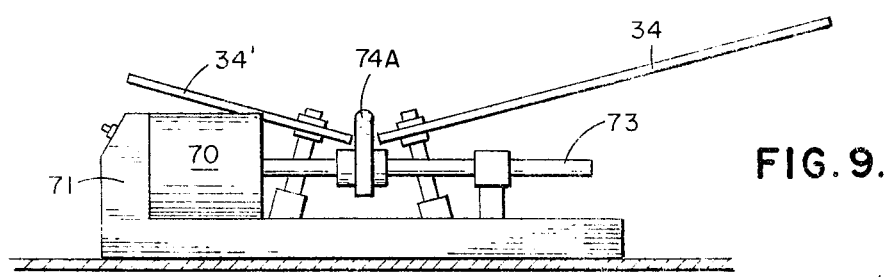

Instead of employing two heads 74, 74', a single head 74A can be used between the legs of the vanes, which are positioned closer together, as best shown in FIG. 9. When shaft 73 together with head 74A move to the right, vanes 34, 36 extend outwardly. When shaft 73 and head 74A move to the left, auxiliary vanes 34', 36' extend outwardly.

Referring now to the embodiment of the controller 10" shown in FIGS. 12–17, it is again provided with a main pair of vanes 34, 36 and with an auxiliary pair of vanes 34', 36'. Vanes 34, 36 move throughout their entire range in a single plane P—P which is inclined by an acute angle α relative to the horizontal. These vanes always move in a descending attitude, i.e., they are always inclined forwardly and downwardly (negative angle of attack) in respect to the controller's longitudinal axis 9. The constant negative angle of attack of vanes 34, 36 preferably should not exceed 15°.

Vanes 34', 36' move throughout their entire range in a single plane P'—P' which is inclined by an acute angle α' relative to the horizontal. These vanes always move in an ascending attitude, i.e., they are always inclined forwardly and upwardly (positive angle of attack) in respect to the controller's longitudinal axis 9. The constant positive angle of attack of vanes 34', 36' preferably should also not exceed 15°.

Each pair of vanes extends or retracts in unison in response to a depth control signal that can be remotely applied from vessel 11, or internally produced by a force-generator such as the previously described pressure transducer 42 having an output shaft 48. Pivotably coupled to shaft 48 is a linkage arm 80 pivotably secured to another linkage arm 81. By a mechanism comprised of wheels 82, 83 to which are pivotably secured linkage arms 84, 85 and 84', 85', the linear motion of shaft 48 is transformed into a lateral extension or contraction of the main vanes 34, 36. Wheels 82, 83 rotate on shaft 82', 83', respectively. All points of each vane move by the same amount and in the same direction relative to a vertical plane of symmetry.

FIG. 14 illustrates a modification of the wheel mechanism of FIG. 13, whereby more movement can be afforded to the vanes 34, 36.

The operation of controller 10" shown in FIG. 12 is in all respects similar to the operation of the previously described embodiments 10 and 10', except that in embodiment 10", the extensions and contractions of the vanes is achieved by translation instead of by rotation.

While this invention has been described with reference to specific embodiments thereof, it will be apparent to those skilled in the art that various modifications may be made therein without departing from the scope of the claims attached hereto.

What is claimed is:

1. A depth controller for controlling the depth at which an object coupled to the controller is towed in water, said controller comprising:
    a streamlined body;
    depth control elements movably mounted in said body; and
    depth control means operatively coupled to said elements to extend them and retract them from and into said body in dependence upon the depth of the controller in said water.

2. A marine structure adapted to be towed in a body of water comprising:
    a streamlined body;
    depth control elements movably mounted in said body; and
    depth control means operatively coupled to said elements to extend them and retract them from and into said body in dependence upon the depth of said body below the water surface.

3. A depth controller for controlling the depth at which a section of a seismic streamer cable is towed in water, said controller comprising:
    a streamlined body;
    a main pair of movable vanes in said body, each vane having a fixed negative acute angle of attack throughout its entire range of movement;
    an auxiliary pair of movable vanes in said body, each having a fixed positive acute angle of attack throughout its entire range of movement; and
    depth control means operatively coupled to said vanes to control the movement of each pair of vanes from and into said body.

4. The depth controller of claim 3, wherein said movement is a linear movement of translation.

5. The depth controller of claim 3, wherein said movement is a movement of rotation with respect to an axis substantially perpendicular to each vane.

6. A depth controller for controlling the depth at which a controller moves in water, said controller comprising:

a hollow streamlined body having two half housings adapted to become coupled to a towed object;

negative lift producing means movably mounted in said body;

positive lift producing means movably mounted in said body;

force producing means operatively coupled to move said positive and negative lift-producing means in dependence upon the depth of the controller in said water; and each lift-producing means changing its area exposed to the water as it is being moved by said force producing means thereby exerting a controllable lift on said body.

7. The depth controller of claim 6, wherein said negative lift-producing means comprise a main pair of movable vanes in said body, each vane having a fixed negative acute angle of attack throughout its entire range of movement; and said positive lift-producing means comprise an auxiliary pair of movable vanes in said body, each auxiliary vane having a fixed positive acute angle of attack throughout its entire range of movement.

8. The depth controller of claim 7 wherein each pair of vanes is symmetrically mounted relative to a vertical plane passing through the controller's longitudinal axis.

9. The depth controller of claim 8 wherein each pair of vanes is moved by a separate force producing means.

10. The depth controller of claim 8 wherein each pair of vanes is moved by a single force producing means.

11. The depth controller of claim 8 wherein, each force producing means comprise a pressure transducer having an output shaft movable with changes in ambient water pressure; and means pivotally coupling each of said vanes to said shaft.

12. The depth controller of claim 9 wherein, each force producing means comprise a pressure transducer having an output shaft movable with changes in ambient water pressure; and means pivotally coupling each of said vanes to said shaft.

* * * * *